United States Patent [19]

Gelardi et al.

[11] Patent Number: 4,655,408

[45] Date of Patent: Apr. 7, 1987

[54] SEPARATE TAPE GUIDE FOR A CONTINUOUS LOOP TAPE CASSETTE

[75] Inventors: Anthony L. Gelardi, Cape Porpoise; Diane Pruneau, Saco, both of Me.; Richard Rolfe, Madison, Conn.

[73] Assignee: Shape Inc., Biddeford, Me.

[21] Appl. No.: 842,368

[22] Filed: Mar. 19, 1986

Related U.S. Application Data

[63] Continuation of Ser. No. 657,667, Oct. 4, 1984, abandoned.

[51] Int. Cl.[4] .............................................. B65H 20/26
[52] U.S. Cl. .............................. 242/55.19 A; 242/76
[58] Field of Search ............................ 242/55.19, 76

[56] References Cited

U.S. PATENT DOCUMENTS

| | | | |
|---|---|---|---|
| 3,033,074 | 5/1962 | Schaefer | 242/76 |
| 3,235,264 | 2/1966 | Mikrut . | |
| 3,348,786 | 10/1967 | Miller et al. . | |
| 3,432,111 | 3/1969 | Ryder . | |
| 3,495,787 | 2/1970 | Wallace . | |
| 3,635,414 | 1/1972 | Patel | 242/55.19 A |
| 3,642,228 | 2/1972 | Tollkuhn . | |
| 3,706,426 | 12/1972 | Prahl . | |
| 3,796,394 | 3/1974 | Souza . | |
| 3,888,429 | 6/1975 | Mack | 242/55.19 A |
| 3,910,692 | 10/1975 | Scibilia . | |
| 3,934,842 | 1/1976 | Posso . | |
| 4,006,493 | 2/1977 | Gerry . | |
| 4,013,239 | 3/1977 | Beswick et al. . | |
| 4,023,745 | 5/1977 | Sekine et al. | 242/55.19 A |
| 4,034,927 | 7/1977 | Leshik | 242/55.19 A |
| 4,166,593 | 9/1979 | Milants . | |
| 4,267,986 | 5/1981 | Uemura et al. . | |
| 4,506,846 | 3/1985 | Gelardi et al. | 242/199 |

Primary Examiner—Billy S. Taylor
Attorney, Agent, or Firm—Staas & Halsey

[57] ABSTRACT

A continuous loop tape cassette for use with an external tape player/recorder apparatus, having a cassette base, a cover and a separate tape guide positioned therebetween. The separate tape guide includes an elongated bridge molded of a low friction plastic and having substantially planar top and bottom surfaces, left and right ends with curved, relatively flat, front surfaces which are slightly slanted relative to the substantially planar top and bottom bridge surfaces, and a flange formed integrally of the front top surface of each end. In addition, locating holes are formed at each left and right end to receive corresponding projections formed on the cassette base and to orient the bridge relative to the tape cassette. Finally, there is provided between the left and right ends a leaf spring having a relatively soft, tape contacting member thereon for exerting a uniform pressure on the running tape as it crosses the magnetic head of the external tape player/recorder apparatus. The curved, relatively flat, front surfaces of the left and right ends, together with the flange and tape contacting member define the tape guiding surface of the tape guide.

3 Claims, 7 Drawing Figures

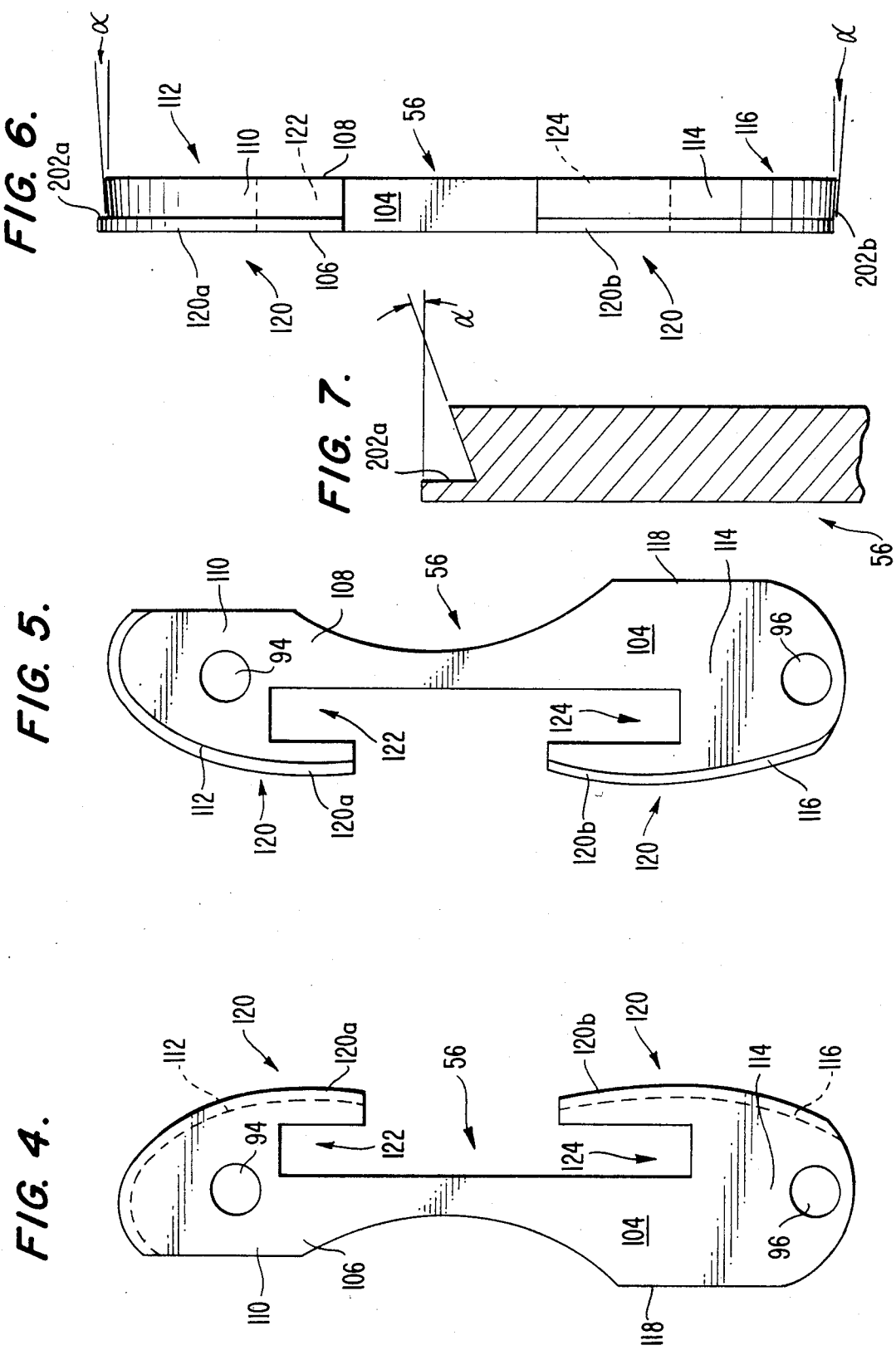

SEPARATE TAPE GUIDE FOR A CONTINUOUS LOOP TAPE CASSETTE

This is continuation of co-pending application Ser. No. 657,667 filed on 10/4/84, now abandoned.

BACKGROUND OF THE INVENTION

This invention relates to a tape cassette, and more particularly, to a continuous loop tape cassette having a separate tape guide for guiding tape along the open front of the tape cassette and across a magnetic head of an external tape player/recorder apparatus.

Shown in FIG. 1 and described more fully hereafter is a conventional continuous loop tape cassette presently in use which is designed to store and dispense magnetic recording tape continuously. More particularly, between a cassette base and cover, a single tape hub carries a tightly wound continuous coil of tape. The tape exits the middle of the coil and passes over a "tape guide region," while being exposed to the magnetic head of an external tape player/recorder apparatus. The tape then passes along a resilient pinch wheel, which urges the tape against a drive capstan of the external apparatus, and returns to the outside of the tape coil. This tape travelling path is repeated throughout operation of the cassette.

Another example of the above-described type of continuous loop tape cassette is described in U.S. Pat. No. 4,013,239, issued to Beswick et al.

To ensure optimum operation of a continuous loop tape cassette, it is important that the tape crossing the magnetic head be properly oriented to ensure proper contact between the running tape and the magnetic head. Improper operation is often the result of improper orientation of the tape at the tape guide region. Thus, the tape guide region of a continuous loop tape cassette must be molded according to strict structural parameters.

This need to manufacture according to strict structural parameters must be balanced against the need of economy of construction because of the vast quantities of compact, continuous loop tape cassettes made and sold.

Until now, this balance has best been met by molding most of the tape guide region integrally of the cassette base. More particularly, conventional continuous loop tape cassettes usually include a tape guide region having two "conical posts" molded in the front open area of the cassette base, as shown in FIG. 1. It is also known that to promote proper tape orientation, each conical post must then be separately capped by a metal washer which overhangs the post to form a "shelf". As the tape travels around the conical posts, the tape is caused to ride up the slightly slanted surfaces thereof until the upper edge of the tape abuts the shelf. Thereafter, the tape is guided by the conical posts and the shelf.

This conventional arrangement has the following general disadvantages.

Firstly, the structural accuracy of the tape guide region is only as good as the molding process used to form the conical posts integrally of the cassette base. Molding plastics to certain structural specifications can be very difficult and expensive. The more detailed the structural specifications of the molded product, the greater the chance for mold imperfections, especially where cost of manufacturing is a preoccupation. More particularly, the conical posts are difficult to mold accurately onto the cassette base because of the posts' internal location on the cassette base. In addition, it is known that the shelf must necessarily be a separate piece from each conical post because it is almost impossible to accurately mold the posts and shelf integrally of the cassette base.

Secondly, the metal washers making up the separate shelf are difficult to apply to the tops of the posts by automation. Accordingly, efficient automation, a goal of any manufacturing process, is difficult to effect with the prior art design. In addition, if clearance exists between the mounted washer and the cassette cover, the washer may undesirably move during operation of the cassette and change the orientation of the tape.

Thirdly, since the tape guide region must be made of a plastic having a low coefficient of friction which is usually relatively more expensive, the cassette base molded integrally therewith must also be molded of the same relatively expensive plastic.

From the foregoing, it can be seen that an improved tape guide region for a continuous loop tape cassette is desired which effectuates proper orientation of the tape in the tape cassette crossing the magnetic head of a tape player/recorder and which is relatively simple in structure such that it may be manufactured and assembled easily, accurately and costefficiently through automation.

SUMMARY OF THE INVENTION

Accordingly, it is an object of the present invention to provide a continuous loop tape cassette which operates smoothly and continuously.

It is another object of the present invention to provide an economical, high quality, continuous loop tape cassette which is molded substantially of relatively inexpensive plastic and which can be formed and assembled efficiently by automation.

It is another object of the present invention to provide a tape guide region for a continuous loop tape cassette which accurately guides tape across the magnetic head of an external tape player/recorder.

It is another object of the present invention to provide a tape guide region for a continuous loop tape cassette whose structural accuracy is not restricted by the current state of the plastics molding art.

It is another object of the present invention to provide a separate tape guide for a continuous loop tape cassette which is easier to mold because its critical surfaces can be more easily accessed by a mold.

It is another object of the present invention to provide a continuous loop tape cassette having a separately molded tape guide which replaces the traditional molded conical posts and separate metal washers combination.

It is another object of the present invention to provide a separate tape guide for a continuous loop tape cassette whose tape guiding surface is defined by a gradually curved surface with a flange molded integrally thereof along a top edge, and whose design parameters can be carefully controlled.

Finally, it is an object of the present invention to provide a separate tape guide for a continuous loop tape cassette, wherein the tape guide can be molded from a different material than the tape cassette cover and base, thus allowing a higher quality and higher cost material to be used for the tape guide but a lower quality and lower cost material for the tape cassette. Hence, a tape cassette can be produced more cost efficiently.

To attain the objects described above according to the present invention, a preferred embodiment of the present invention includes a continuous loop tape cassette having a base, a cover and a separately molded tape guide inserted therebetween. The separate tape guide of the present invention includes an elongated bridge molded entirely of a relatively low coefficient of friction material and having a top, substantially planar surface; a bottom, substantially planar surface; a left end with a curved surface; a right end with a curved surface; a flange integrally formed along the top front of the left and right ends; and a partially flat back surface. The curved surfaces of each of the left and right ends have a "conical" or slightly slanted surface relative to the planes of the top and bottom surfaces. There is also provided a locating hole in each of the left and right ends of the bridge which combine with posts extending from the cassette base to fixedly orient the separate tape guide relative to the cassette. Finally, there is provided between the left and right ends a resilient leaf spring having a relatively soft, tape contacting member. This spring is intended to exert a uniform pressure on the tape running across the magnetic head and between the left and right ends of the separate tape guide. The curved, slightly slanted, surfaces of the left and right ends, together with the flange and tape contacting member, define the tape guiding surface of the tape guide of the present invention.

This invention has the following general advantages over the prior art:

1. The tape guide region is more easily and accurately manufactured according to the present invention because the bridge is integrally molded as one piece, apart from the molding step forming the cassette base. Accordingly, the critical areas of the tape guide region can be more easily accessed by the mold.

2. The separate tape guide of the present invention allows more efficient automation to be used in assembling a continuous loop tape cassette because the separate "washers" shelf do not have to be applied to the tape guide region. In addition, since the "flange" is formed integrally of each conical surface, the flange will not undesirably move, as a separate washer does if clearance exists between the cassette cover and the washer.

3. The tape guide of the present invention can be molded from a different material than the cassette base and cover. This allows a higher cost and higher quality material to be used for the tape guide and a lower cost and lower quality material to be used for the cassette base and cover. Hence, a cost-efficient, high quality continuous loop tape cassette can be produced.

These objects, together with other objects and advantages which will become subsequently apparent, reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is a top view of the preferred embodiment of the separate tape guide of the present invention;

FIG. 5 is a bottom view of the preferred embodiment of the separate tape guide of the present invention;

FIG. 6 is a front view of the preferred embodiment of the separate tape guide of the present invention.

FIG. 7 is a cut away, cross-sectional view of one end of the tape guide shown in FIG. 6.

DETAILED DESCRIPTION OF THE PREFERRED EMBODIMENTS

For convenience of reference to the accompanying drawings, "front" indicates the area of the continuous loop tape cassette exposed to the magnetic head of the external tape player/recorder, "back" is the area of the tape cassette opposite the front, "top" is the planar surface of the tape cassette facing up when the front of the cassette is inserted into the external tape player/recorder, "bottom" is the planar surface opposite and parallel to the top, and "sides" are the areas extending perpendicularly between and connecting the edges of the top and bottom.

Figure 1:
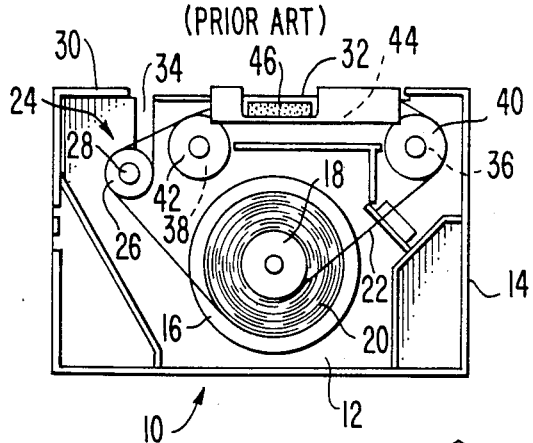
FIG. 1 is a top plan view of a conventional continuous loop tape cassette, illustrating particularly the cassette base with the cassette cover off and the tape hub positioned therein with tape extending across a tape guide region.

FIG. 1 illustrates an example of a continuous loop tape cassette known in the prior art. The cassette is generally indicated by reference numeral 10. A rectangular base 12 is surrounded by a substantially continuous perpendicular wall 14. The free edge of the wall 14 has flanges therealong (not shown) for engagement with the cassette cover (not shown). The base 12 has a circular recess 16 to receive a flanged circular hub 18. The hub 18 carries a tape coil 20 made of magnetic tape 22. A pinch-wheel 24, comprising a resilient tire 26 and an axle hub 28, rotates on the base 12. The front wall 30 of the cassette base 12 has openings 32 and 34 to access a magnetic record/playback head and a drive capstan of an external tape player/recorder (not shown), respectively, during operation. A pair of conical posts 36 and 38 are molded integrally of the cassette base 12 and are capped by separate metal washers 40 and 42. A leaf spring 44 having a relatively soft, tape contacting member 46 located centrally on the front thereof is positioned between the conical posts 36 and 38 to urge the running tape 22 against the magnetic head. Together, the posts 36 and 38, the washers 40 and 42 and the tape contacting member 46 form the tape guide region of the prior art device.

Continuous loop tape cassettes are usually about 2½ inches long, 1 and ¾ inches wide and ¼ inch thick. The material used to mold the entire conventional cassette, including the posts 36 and 38, is a hard plastic, usually polycarbonate.

During operation of the conventional cassette 10, the external drive capstan urges the tape 22 against the pinch wheel 24 and drives it into the outer convolution of the tape coil 20. The hub 18 rotates and the tape 22 exits the tape coil 20 at the middle thereof. The tape 22 then travels across the conical post 36 and washer 40, the tape contacting member 46, the conical post 38 and washer 42 and again around the pinch wheel 24, where it begins its course again.

Figure 2:
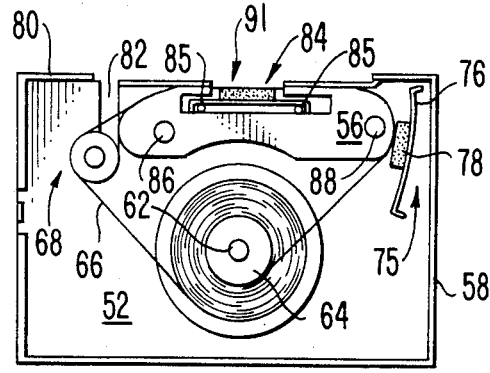
FIG. 2 is a top plan view of the preferred embodiment of the continuous loop tape cassette according to the present invention, illustrating particularly the cassette base with the separate tape guide of the present invention positioned therein.
Figure 3:
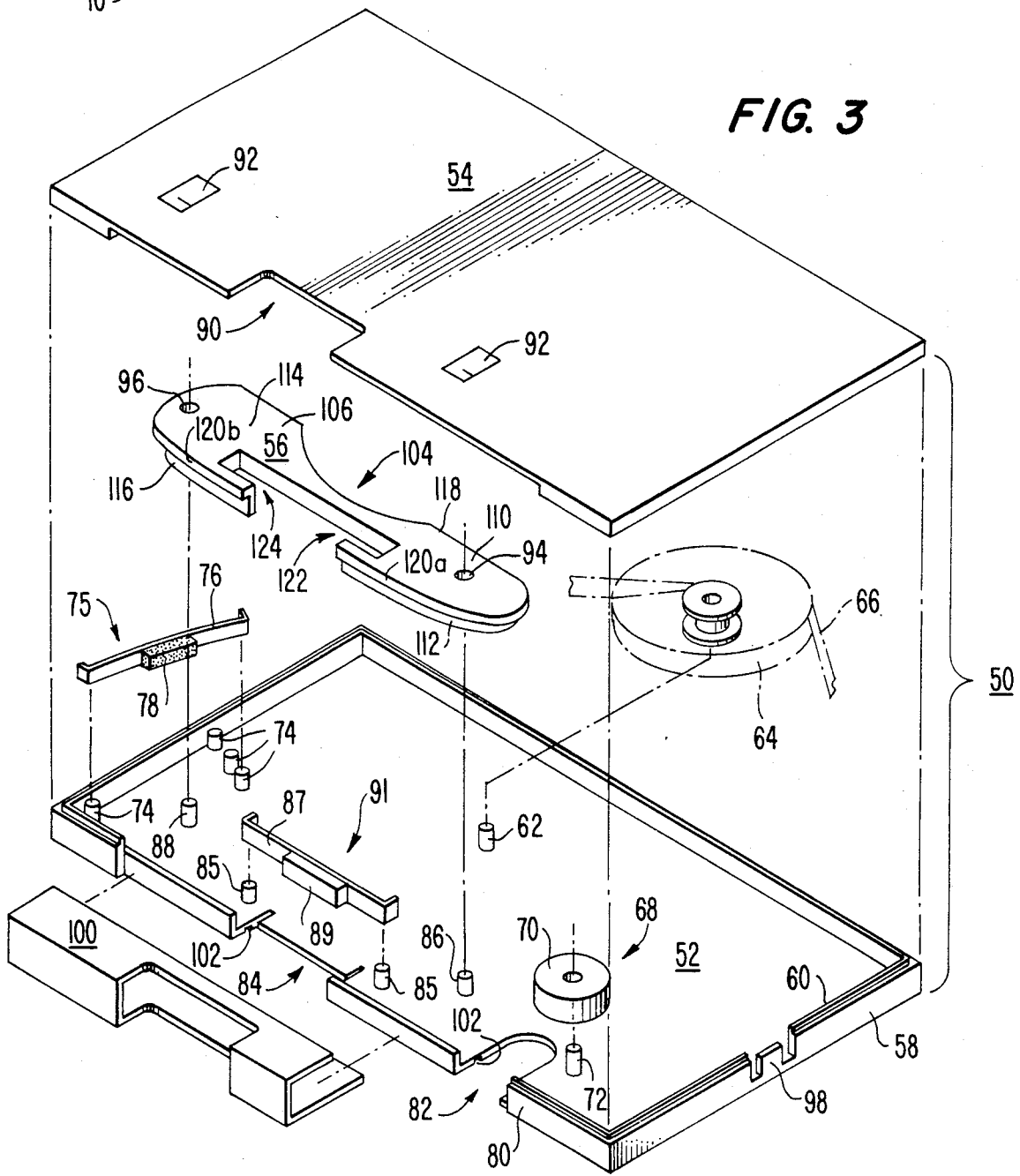
FIG. 3 is an exploded view of the continuous loop tape cassette of the present invention, illustrating particularly assembly of the separate tape guide of the present invention within the continuous loop tape cassette.

FIGS. 2 and 3 illustrate the continuous loop tape cassette according to the present invention, indicated generally by reference numeral 50. The tape cassette includes a substantially planar base 52 and cover 54 (FIG. 3), which are preferably made of polystyrene. In addition, a separate tape guide 56 is located between the cassette base 52 and cover 56.

The cassette base 52 is surrounded by a substantially continuous perpendicular wall 58. The free edge of the wall 58 has flanges 60 (FIG. 3) therealong for engagement with the cover 54. The cassette base 52 also has a projection 62 located substantially centrally thereof to receive a tape hub 64.

That is, positioned within the continuous loop tape cassette 50 is a flanged reel or tape hub 64, about which the tape 66 is continuously coiled. The tape hub 64 is preferably a single, molded piece made of a low friction plastic such as acetal. One area of the coil of tape 66 is placed across the front of the separate tape guide 56 and around a pinch wheel 68, including a tire 70 and an axle hub 72.

Further, there are provided projections 74 extending from the cassette base 52 for receiving a spring means 75 or "drag pad", such as a leaf spring 76 having a relatively soft, tape contacting member 78 positioned thereon, for pressing the tape 66 against the separate tape guide 56.

FIGS. 2 and 3 illustrate that the front wall 80 of the cassette base 52 has formed therein a left aperture 82 for receiving the drive capstan of the external tape player/-recorder apparatus and a substantially central aperture 84 for receiving the magnetic head. The outside of the cassette base 52 also includes a stacking ridge (not shown), as is known in the art.

The separate tape guide 56 according to the present invention is positioned near the front wall 80 of the tape cassette 50, on the cassette base 52. More particularly, locating posts 86 and 88 are formed on the cassette base 52 to receive locating holes 94 and 96 formed in the separate tape guide 56, as more fully described hereafter.

Finally, the cassette base 52 includes projections 85 for locating a spring means 91, e.g., a leaf spring 87 having a relatively soft, tape contacting member 89 located centrally thereon, for pushing the running tape 66 against the magnetic head.

The cover 54 of the continuous loop tape cassette 50 according to the present invention comprises reel, tire and tape hold downs or projections (not shown) formed thereon. The cassette cover 54 also includes a central aperture 90 corresponding to the central aperture 84 formed in the cassette base 52 and recesses 92 important for locating the tape cassette 50 relative to the external apparatus.

As best seen in FIG. 3, to assemble the continuous loop tape cassette of the present invention, the leaf spring 87 is positioned against the projections 85. Of course, the leaf spring 87 is oriented so that the tape contacting member 89 is positioned adjacent the openings 84 and 90 in the tape cassette 50. The tape guide 56 is inserted into the cassette base 52 such that the locating holes 94 and 96 receive the locating posts 86 and 88 formed on the cassette base 52. The tire 70 of the pinch wheel 68 is positioned on the axle hub 72. The tape hub 64 is positioned on the tape hub post 62 formed on the cassette base 52. The tape 66 is extended around the separate tape guide 56 and the tire 70 of the pinch wheel 68. The leaf spring 76 is also positioned about the projections 74. A write protect tab 98 and an automatic reel lock (not shown) may also be used.

The cassette cover 54 is then positioned on the cassette base 52 by receiving the flanges 60 on the walls 58.

In addition, a sliding cover 100 is positioned about the front wall 80 in sliding grooves 102 formed in the cassette base 52.

As best seen in FIGS. 4-6, the separate tape guide 56 of the present invention comprises an elongated bridge 104 preferably made of a low friction, single-piece of hard molded plastic such as "ABS" (acrylonitrile butadiene styrene). The elongated bridge 104 has a planar top 106, a planar bottom 108, a left end 110 having a curved front surface 112, a right end 114 having a curved front surface 116 and a partially flat back 118. The curved front surfaces 112 and 116 of each of the left and right ends 110 and 114, respectively, are slightly slanted relative to the planes of the top surface 106 and the bottom surface 108 at an angle $\alpha$. This angle or slant is preferably about 1° in a reversed draft direction as shown by references character $\alpha$ in FIGS. 6 and 7.

Along the curved front surfaces 112 and 116 of each of the left and right ends 110 and 114, respectively, there is formed perpendicularly at the top thereof a shelf or flange 120. More particularly, there is a left front flange 120a and a right front flange 120b, each intended to receive in abutting relation the upper edge of the tape 66 running along the separate tape guide 56 specifically, edges 202a and 202b shown in FIG. 6 during operation of the tape cassette 50.

As also suggested above, the separate tape guide 56 contains a pair of top-to-bottom, cylindrical locating holes 94 and 96. The locating holes 94 and 96 are formed in the left end 110 and the right end 114 and are important because they define the position of the tape guide 56 relative to the tape cassette 50.

As suggested above, the tape guide 56 includes a spring means 91 having a leaf spring 87 and a relatively soft, low-friction, tape contacting member 89 located centrally thereof. The ends of the leaf spring 87 can be bent and positioned within the left end 110 and the right end 114, respectively, in left and right areas 122 and 124 formed therein. The spring means 91 is capable of deflecting and exerting uniform pressure against the tape 66 crossing the magnetic head during operation.

The curved and slanted front surfaces 112 and 116 of the left and right ends 110 and 114, respectively, along with the flange 120 and the tape contacting member 89, define the tape guiding surface of the tape guide 56 of the present invention.

Operation of the present invention is similar to that of the conventional cassette. That is, the external drive capstan urges the tape 66 against the pinch wheel 68 and drives it into the outer convolution of the coil of tape 66 on the tape hub 64. The tape hub 64 rotates and the tape 66 exits at the middle thereof. The tape 66 then travels across the curved front surface 116 of the right end 114, the tape contacting member 89 and the curved front surface 112 of the left end 110 and again around the pinch wheel 68, where it begins its course again.

In contrast to manufacturing the conventional conical posts 36 and 38 formed integrally of cassette base 12 and the separate "shelf" made of washers 40 and 42, as described above, manufacturing the present invention's separate tape guide 56, including the curved, slanted front surfaces 112 and 116 of the left and right ends 110 and 114, respectively, and the flanges 120a and 120b molded integrally thereof, is easier and can be more carefully controlled than was possible according to the prior art. Thus, the accuracy of the tape guiding surface of the tape guide region is no longer made dependent on the current state of the plastics molding art.

In addition, according to the present invention the tape guide region near the magnetic head, i.e., the area most important for overall performance, can be given greater engineering and manufacturing effort, while less engineering and manufacturing effort can be devoted to producing the rest of the tape cassette. Accordingly, an effective but cost efficient continuous loop tape cassette is provided.

Thus, the major drawbacks of the conventional cassette are overcome by the present invention since the accuracy of the tape guiding surface of the tape guide region is not dependent upon the present state of the plastics molding art and automated production is facilitated since separate metal washers no longer need to be inserted onto the molded conical posts.

As seen from the above description, this invention provides an efficient design wherein the tape guide region is more easily and accurately formed than in the prior art; locating holes aid in orienting the separate tape guide relative to the tape cassette; the molded conical posts and shelf combinations define part of the tape guiding surface of the tape guide region instead of imprecise conical posts integrally molded of the cassette base with separate metal washers located thereon; and a spring which combines with the separate tape guide to urge a uniform pressure upon the tape crossing the magnetic head. These above features of the present invention provide a more efficiently manufactured and operated continuous loop tape cassette with improved magnetic reproduction and playback characteristics.

The above-described separate tape guide has been shown to be of the type intended for use in continuous loop tape cassettes for data storage and repeatable playback. However, the invention can be similarly applied to other tape cassettes, such as non-continuous loop video, audio or other playing and/or recording cassettes or devices.

The foregoing is considered illustrative only of the principles of the invention. For example, although preferable, it is not necessary for the tape guide to be molded separately from the remainder of the tape cassette, as long as the tape guiding surface is formed as described herein. Further, since numerous modifications and changes will readily occur to those skilled in the art, it is not desired to limit the invention to the exact construction and operation of the embodiments shown and described. Accordingly, all suitable modifications and variations falling with the scope of the appended claims and their equivalents are intended.

We claim:

1. An independent tape guide for a continuous loop tape cassette, comprising:
   (a) a substantially planar and elongated top, a substantially planar and elongated bottom disposed substantially parallel to the substantially planar top, a back, a left end with a curved, relatively flat, front surface and a right end with a curved, relatively flat front surface, the curved, relatively flat, front surfaces of the left and right ends being disposed at an angle of approximately 1° relative to the substantially parallel top and bottom surfaces;
   (b) a flange formed integrally of the substantially planar top to extend in a coplanar relationship therewith,
   wherein the left and right curved, relatively flat, front surfaces of the left and right ends and the flange define a tape guiding surface for tape being guided through the tape cassette; and
   (c) spring means extending between the left and right ends for urging tape being guided along the tape guiding surface against an external tape player/recorder apparatus.

2. A continuous loop tape cassette, comprising:
   (a) a cassette housing having—
      (i) a base,
      (ii) a cover joined to the base; and
   (b) an elongated, independent tape guide positioned between the base and cover, the tape guide having—
      (i) a substantially planar top,
      (ii) a substantially planar bottom disposed substantially parallel to the substantially planar top,
      (iii) a left end with a curved, relatively flat, front surface disposed at an angle of approximately 1° relative to the substantially parallel top and bottom surfaces,
      (iv) a right end with a curved, relatively flat, front surface disposed non-perpendicular relative to the substantially parallel top and bottom surfaces, and
      (v) a flange formed integrally of the substantially planar top to extend in a coplanar relationship therewith,
   wherein the curved, relatively flat, front surfaces of each left and right end and the flange define a tape guiding surface for tape being guided through the tape cassette, and
   wherein first and second projections are formed on the cassette base and first and second locating holes are formed in the left and right ends of the tape guide, respectively, for receiving the first and second projections to orient the tape guide relative to the tape cassette.

3. A continuous loop tape cassette, comprising:
   (a) a cassette housing having—
      (i) a base,
      (ii) a cover joined to the base;
   (b) an elongated, independent tape guide positioned between the base and cover, the tape guide having—
      (i) a substantially planar top,
      (ii) a substantially planar bottom disposed substantially parallel to the substantially planar top,
      (iii) a left end with a curved, relatively flat, front surface disposed at an angle of approximately 1° relative to the substantially parallel top and bottom surfaces,
      (iv) a right end with a curved, relatively flat, front surface disposed non-perpendicular relative to the substantially parallel top and bottom surfaces, and
      (v) a flange formed integrally of the substantially planar top to extend in a coplanar relationship therewith,
   wherein the curved, relatively flat, front surfaces of each left and right end and the flange define a tape guiding surface for tape being guided through the tape cassette; and
   (c) spring means extending between the left and right ends for urging tape being guided along the tape guiding surface against an external tape player/recorder apparatus.

* * * * *